United States Patent [19]

Millar

[11] Patent Number: 5,404,797

[45] Date of Patent: Apr. 11, 1995

[54] APPARATUS FOR VENDING FRIED FOODS

[75] Inventor: Marty R. Millar, Frisco, Tex.

[73] Assignee: SimplyFry, Inc., Dallas, Tex.

[21] Appl. No.: 277,834

[22] Filed: Jul. 20, 1994

[51] Int. Cl.⁶ .................. A47J 27/00; A47J 37/00; A47J 37/12; G01F 11/00

[52] U.S. Cl. .................................. 99/357; 99/407; 221/150 R; 221/150 HC

[58] Field of Search ............... 99/357, 330, 334–336, 99/352, 355, 403, 404, 407, 409–411, 427, 443 R, 443 C; 221/150 R, 150 A, 150 HC, 81, 85, 116; 222/371, 415; 62/63, 382

[56] References Cited

U.S. PATENT DOCUMENTS

| | | | |
|---|---|---|---|
| 2,235,922 | 3/1941 | Friesenhahn | 222/371 |
| 2,480,339 | 8/1949 | Rifkin | 221/150 R |
| 2,692,067 | 10/1954 | Hapman | 222/415 |
| 3,010,556 | 11/1961 | Wawrzonek et al. | 221/150 R |
| 3,667,373 | 6/1972 | Sicher et al. | 99/407 |
| 3,685,432 | 8/1972 | Hoeberigs | 99/357 |
| 3,690,247 | 9/1972 | Van Cleven et al. | 99/355 |
| 3,818,820 | 6/1974 | Harris et al. | 99/407 |
| 4,228,730 | 10/1980 | Schindler et al. | 99/404 |
| 4,646,627 | 3/1987 | Bartfield et al. | 99/330 |
| 4,671,425 | 6/1987 | Knoll | 221/150 HC |
| 4,722,267 | 2/1988 | Galockin et al. | 99/357 |
| 4,722,276 | 2/1988 | Galockin et al. | 99/357 |
| 4,748,902 | 6/1988 | Maurantonio | 99/326 |
| 4,821,633 | 4/1989 | Ripatonda | 99/407 |
| 4,838,455 | 6/1989 | Hoeberigs | 99/357 |
| 5,029,520 | 7/1991 | Okada | 99/403 |
| 5,069,116 | 12/1991 | Marquez et al. | 99/336 |
| 5,224,415 | 7/1993 | McFadden et al. | 221/15 |
| 5,319,939 | 6/1994 | McFadden et al. | 62/63 |

Primary Examiner—Timothy F. Simone
Attorney, Agent, or Firm—Timmons & Kelly; H. Dennis Kelly

[57] ABSTRACT

Disclosed is a vending machine for vending fried foods. The machine has a hopper for storing frozen food. The food is measured into a weigh basket and then transferred to a fry basket in a deep frier. The food is fried, and then delivered to the customer in a serving cup. The cooking oil in the deep frier can be replenished or even completely replaced at periodic intervals. The hopper can be moved forward out of the freezer and tilted forward to allow for easier cleaning and refilling. A stack of condiment packages is loaded into a tube, and the tube is inserted into a receiver. The first package rests on a support platform, and the receiver holds the tube at a position to secure all of the packages above the first. A push block on the end of a piston rod pushes the first package out from under the tube, and then retracts to allow the stack to fall to the support platform.

17 Claims, 12 Drawing Sheets

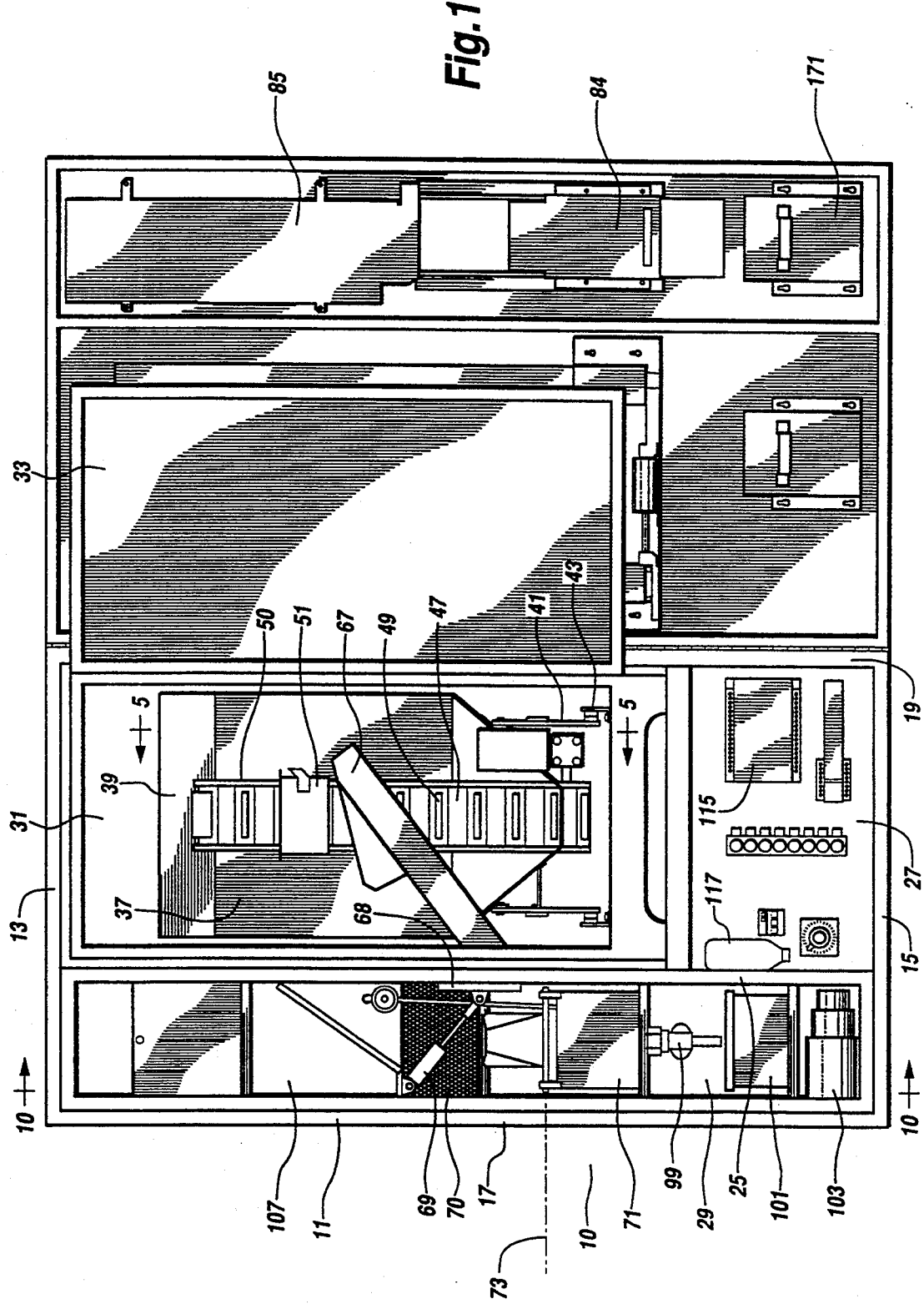

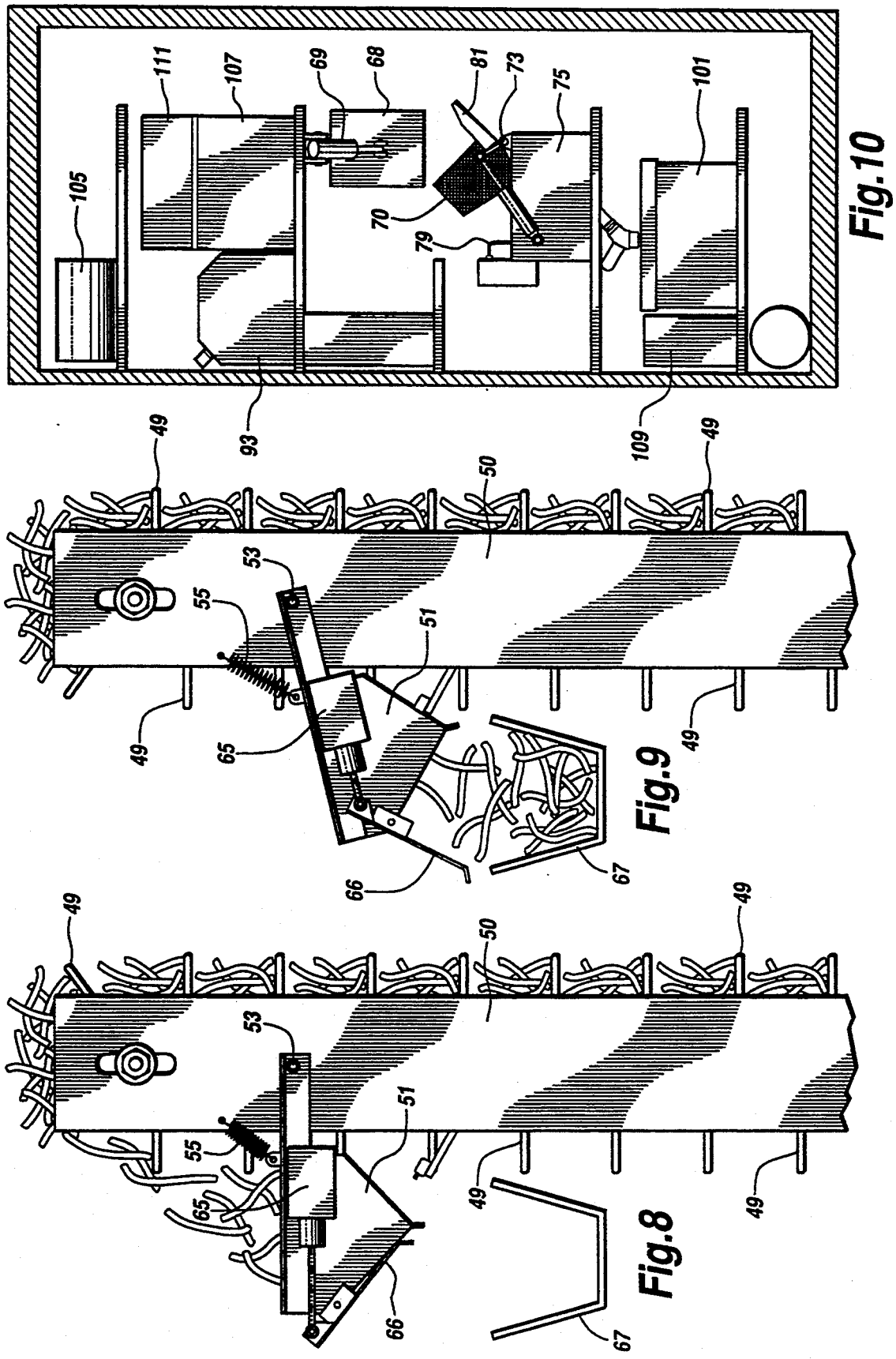

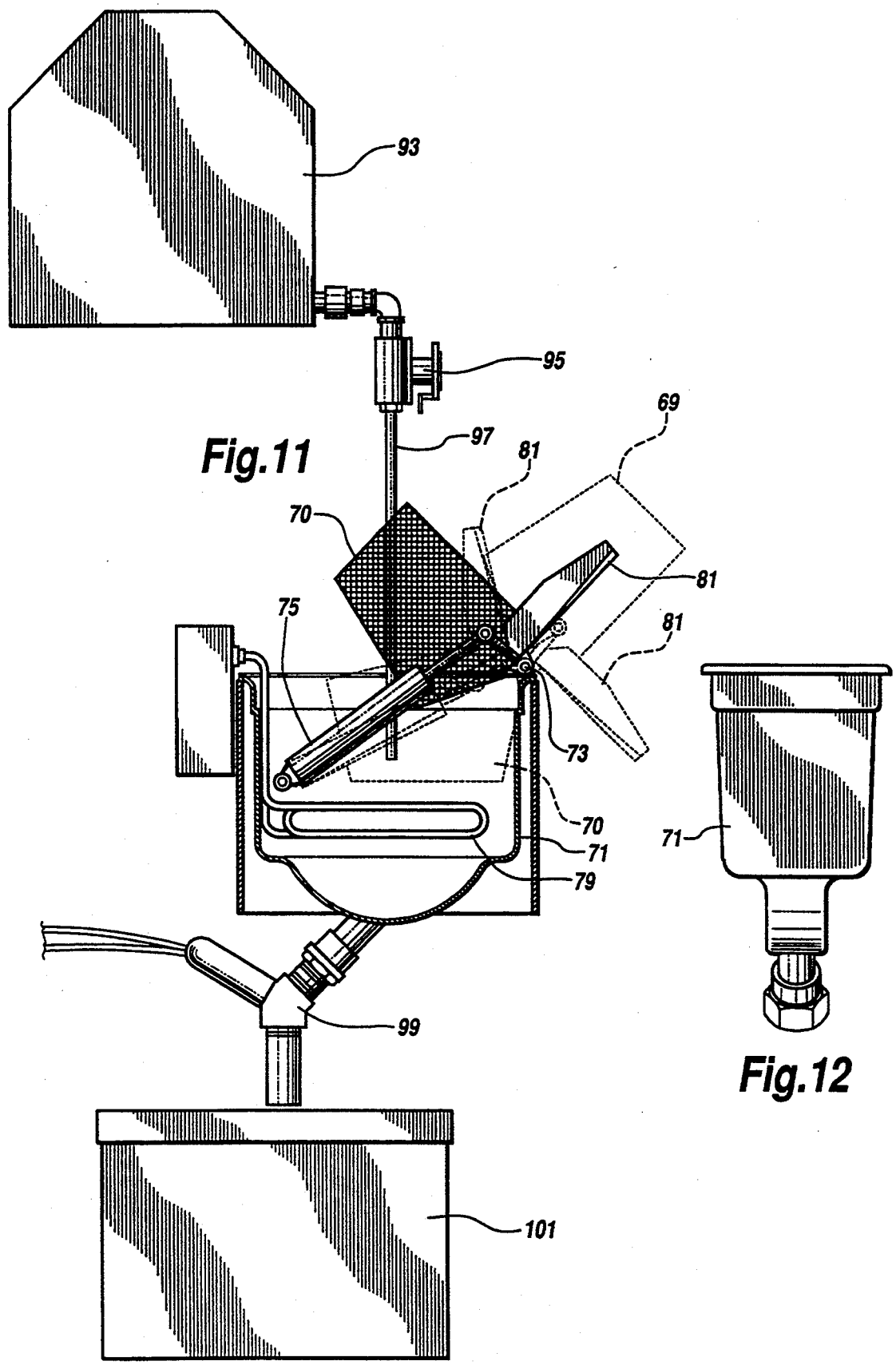

APPARATUS FOR VENDING FRIED FOODS

BACKGROUND OF THE INVENTION

1. Field of the Invention

This invention relates in general to vending machines. In particular, the invention relates to vending machines for vending fried foods and condiments for use with the fried foods.

2. Description of the Prior Art

Vending machines of many types have been known for many years. Many different types of products, including foods such as candy bars and potato chips, have been sold in vending machines. In most machines the food must be cooked or otherwise prepared ahead of time, and packaged in individual bags.

Some vending machines can be used to sell a selected quantity of food out of a bulk storage bin. Foods such as peanuts and popcorn have been sold in this manner.

More recently, it has become possible to store the food uncooked, and then cook the food just prior to delivery. Fried foods, such as french fries and chicken fingers, can be stored in a freezer until a sale is made. Then, the food is cooked in a deep frier and delivered to the customer.

In recent years, condiments, such as ketchup, mustard, and various sauces, have been packaged in small packages containing a single serving. Such packages limit waste of condiments, and allow the condiment to be sold per serving. Without these packages, condiments often must be provided free in large bottles or jars.

If the small packages of condiments can be sold by machine, the packages can be sold by the serving. When the condiments are sold by the serving, must less waste occurs.

When small packages are sold by vending machine, the packages are often stored in individual storage compartments within the machine. It can take many hours to refill the storage compartments in a vending machine.

SUMMARY OF THE INVENTION

The vending machine of the invention has a hopper of uncooked food mounted in a freezer compartment. The uncooked food is transferred to a weigh basket and then to a fry basket in a deep frier located in a cooking chamber. The machine then delivers the cooked food to the customer in a serving cup, with a package of condiments, such as ketchup and salt.

The cooking oil in the deep frier is periodically drained and replaced with fresh oil from a reservoir. The used oil can be filtered and returned to the reservoir for future use. The reservoir also automatically maintains the level of the cooking oil in the deep frier.

The hopper in the freezer compartment can be rolled forward and tilted. This facilitates the cleaning and refilling of the hopper.

The vending machine of the invention also sells or dispenses packages of condiments. The vending machine has a tube for holding a vertical stack of condiment packages. The first condiment package, on the bottom of the stack, rests upon the a support platform. A receiver holds the tube at a position so that the bottom of the tube is above the first package, and below the top of the second package.

A cylinder and piston assembly pushes a push block under the tube, to push the first condiment package out from under the stack. The assembly then pulls the push out from under the tube, to allow the second condiment package to fall to the support platform.

The above, as well as additional objects, features, and advantages of the invention will become apparent in the following detailed description.

BRIEF DESCRIPTION OF THE DRAWINGS

FIG. 1 is a front elevation of the vending machine of the invention, with the front door and the freezer door open.

FIG. 8 is a partial side elevation, as seen along lines 5—5 in FIG. 1, during filling of the weigh basket.

FIG. 9 is a partial side elevation, as seen along lines 5—5 in FIG. 1, during emptying of the weigh basket.

FIG. 10 is a cross sectional view of the vending machine of the invention, as seen along lines 10—10 in FIG. 1.

FIG. 11 is a side elevation of the deep frier of the invention, partially in section.

FIG. 12 is a front elevation of the deep frier of the invention.

DESCRIPTION OF THE PREFERRED EMBODIMENT

Figure 3:
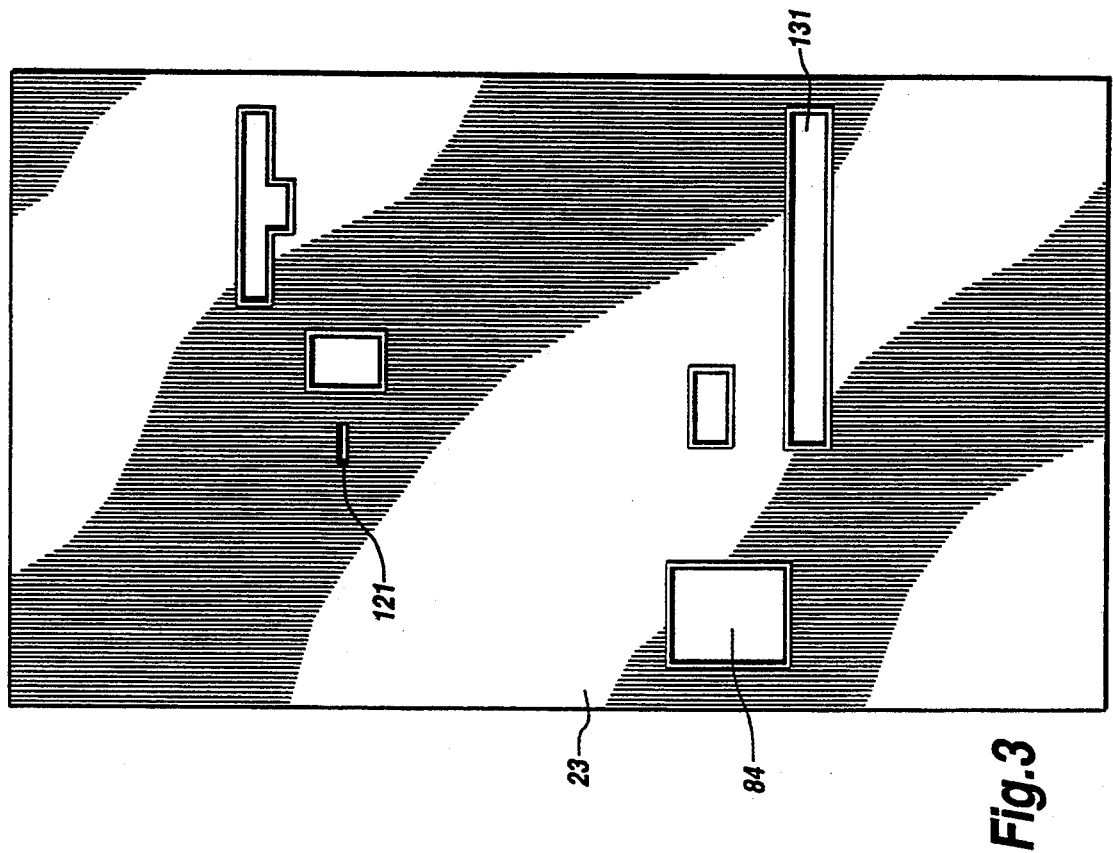
FIG. 3 is a front elevation of the vending machine of the invention, with the front door closed.
Figure 2:
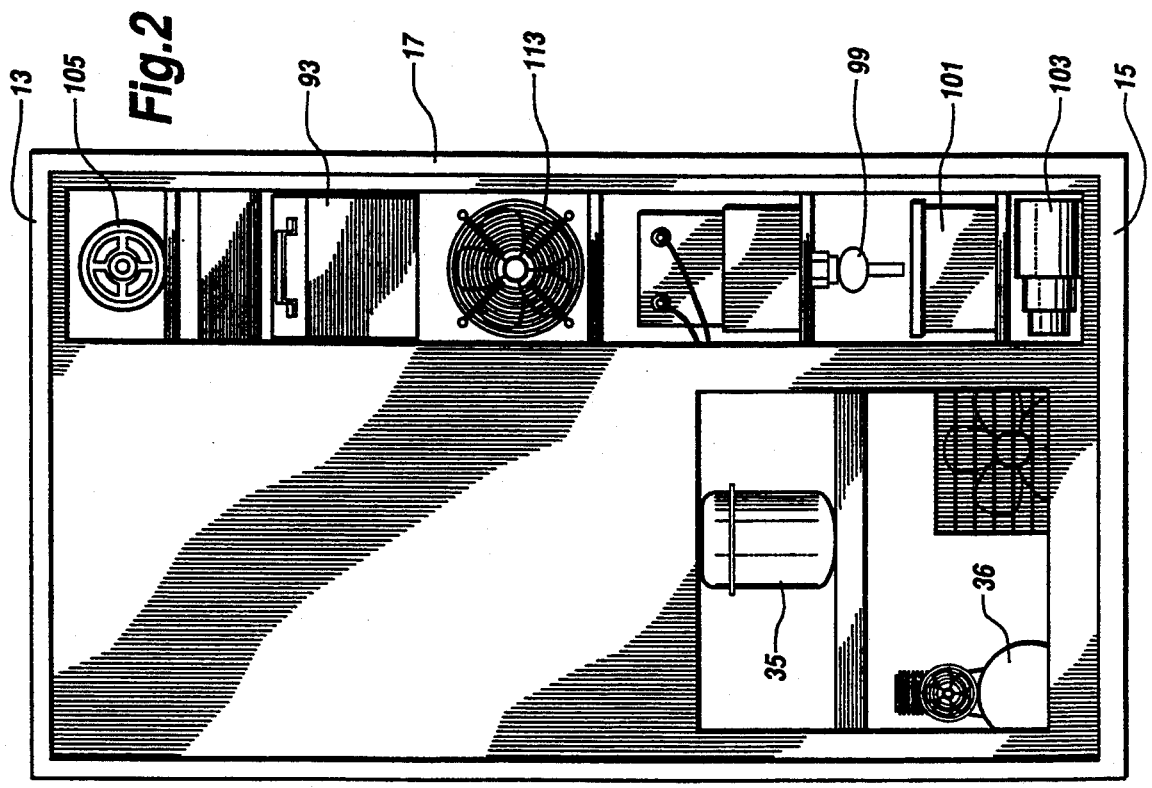
FIG. 2 is a rear elevation of the vending machine of the invention, with the access doors removed.

As shown in FIGS. 1-3, the preferred embodiment of the invention is a vending machine 10 enclosed within a cabinet 11 having a top 13, a bottom 15, two sides 17, 19, and a back 21. A front door 23 is mounted on the cabinet 11 to provide easy access to the inside of the cabinet 11. A partition 25 divides the inside of the cabinet 11 into a storage compartment 27 and a cooking chamber 29.

An insulated freezer compartment 31 is mounted in the storage compartment 27 of the cabinet 11. The freezer 31 has a door 33, which is shown open in FIGS. 1 and 4. The freezer 31 is maintained at a temperature of below zero degrees Fahrenheit by a modular refrigeration unit 35 located in the storage compartment 27 below the freezer compartment 31. The modular refrigeration unit 35 can be seen in FIG. 2.

Also located in the storage compartment 27 below the freezer compartment 31 is an air compressor 36. The air compressor 36 provides compressed air to power the various air cylinders in the vending machine 10.

Figure 4:
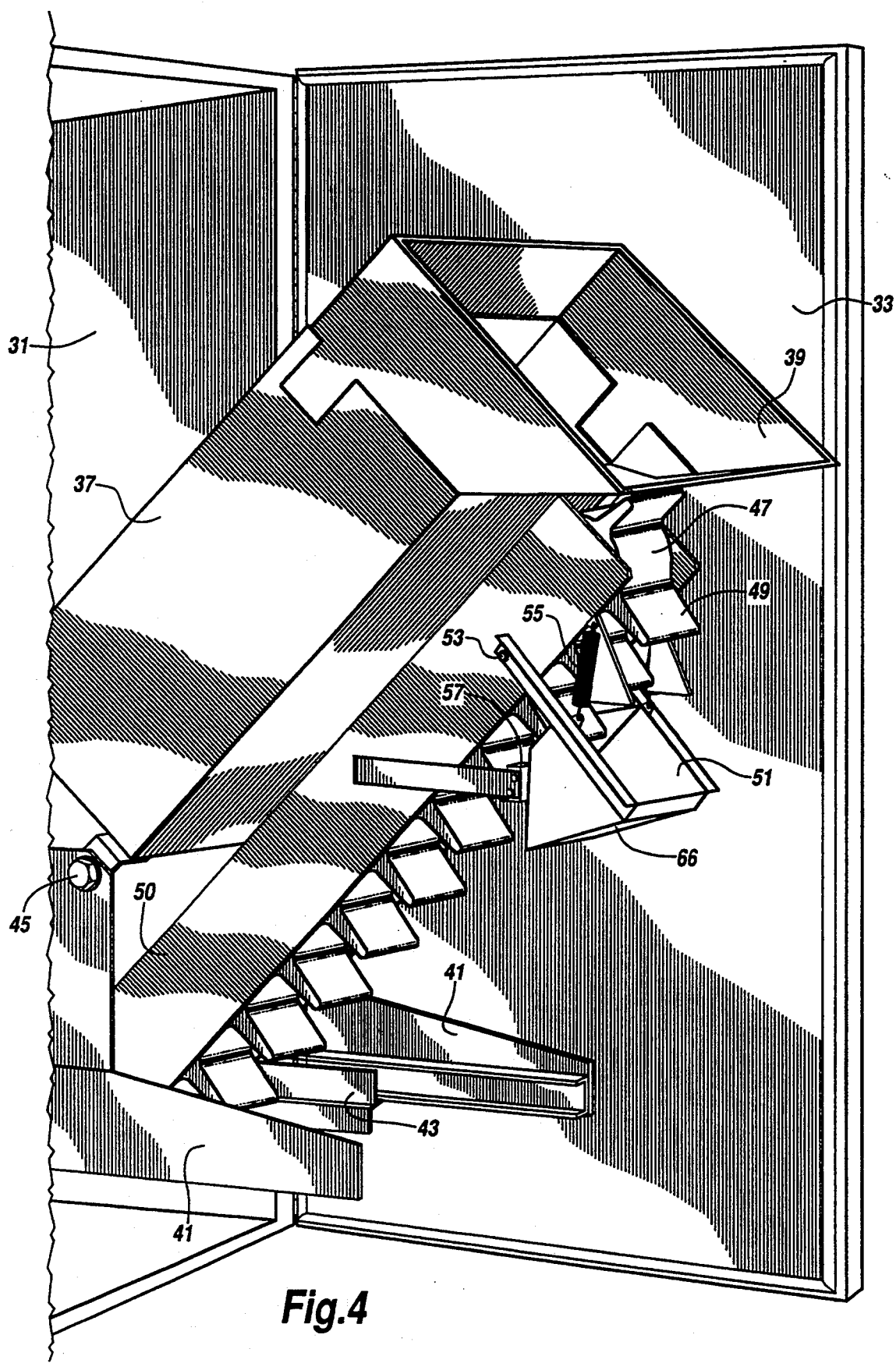
FIG. 4 is a close-up perspective view of the freezer compartment, with the food hopper moved forward and tilted.

The freezer compartment 31 houses a stainless steel food hopper 37 for containing a quantity of uncooked food. The hopper 37 has an extension 39 on the upper end of the hopper 37 to facilitate loading food into the hopper 37. The hopper 37 is mounted on two slide tracks 41 that slide along a pair of stationary tracks 43, so that the hopper 37 can be moved forward out of the freezer compartment 31. The hopper 37 can also be tilted forward about a pivot point 45, as shown in FIG. 4. This forward movement and tilting allows the hopper 37 to be more easily cleaned and refilled.

Figure 5:
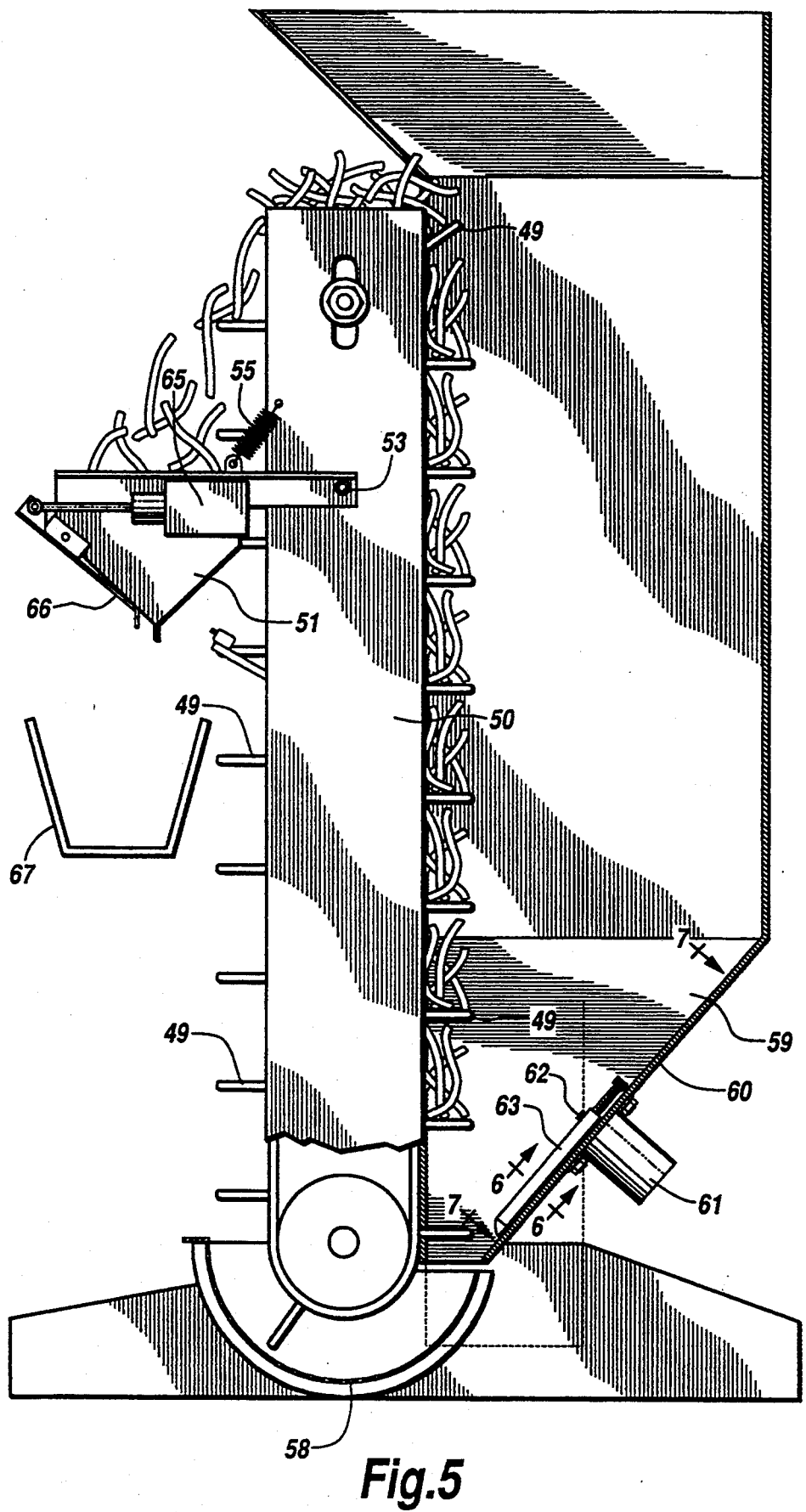
FIG. 5 is a partial side elevation, as seen along lines 5—5 in FIG. 1.

The uncooked food is removed from the food hopper 37 by transfer means shown in FIGS. 5, 8, and 9. The transfer means includes a motor driven conveyor belt 47 having a plurality of cleats 49. The conveyor belt 47 is mounted between a pair of guides 50 that are mounted on the front of the hopper 37. The cleats 49 lift the food upward out of the hopper 37 and over the top of the conveyor belt 47 into a weigh basket 51 mounted on the front of the food hopper 37.

The weigh basket 51 can pivot about an axis through a pivot point 53, but is held by a helical spring 55. As the weigh basket 51 fills with food, the weight of the food forces the basket 51 downward against the spring 55. When a selected amount of food by weight has be deposited into the weigh basket 51, the basket 51 contacts a limit switch 57 mounted on the front of the hopper 37. In response to the limit switch 57, the conveyor belt 47 is stopped and no further food is removed from the hopper 37. The selected amount of food remains in the weigh basket 51 until a customer activates the vending machine.

If the hopper 37 contains less than the selected amount of food, the weigh basket 51 does not fill up and does not contact the limit switch 57. After a selected time period, a programmable timer indicates that the weigh basket 51 has not been filled. The conveyor belt 47 is stopped, and the customer is informed that the vending machine is out of product.

As shown in FIG. 5, a perforated screen 58 is located at the bottom of the hopper 37, to allow crumbs to fall out of the hopper 37. The cleats 49 thus pick up only whole pieces of uncooked food, and the crumbs do not get conveyed to the weigh basket 51.

Figure 6:
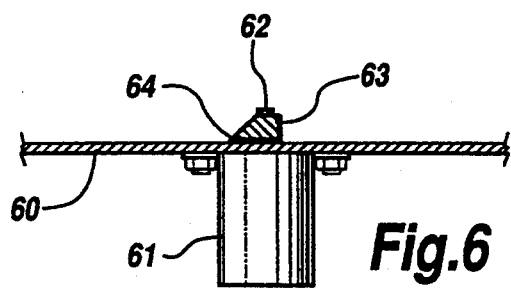
FIG. 6 is a cross-sectional view, as seen along lines 6—6 in FIG. 5.
Figure 7:
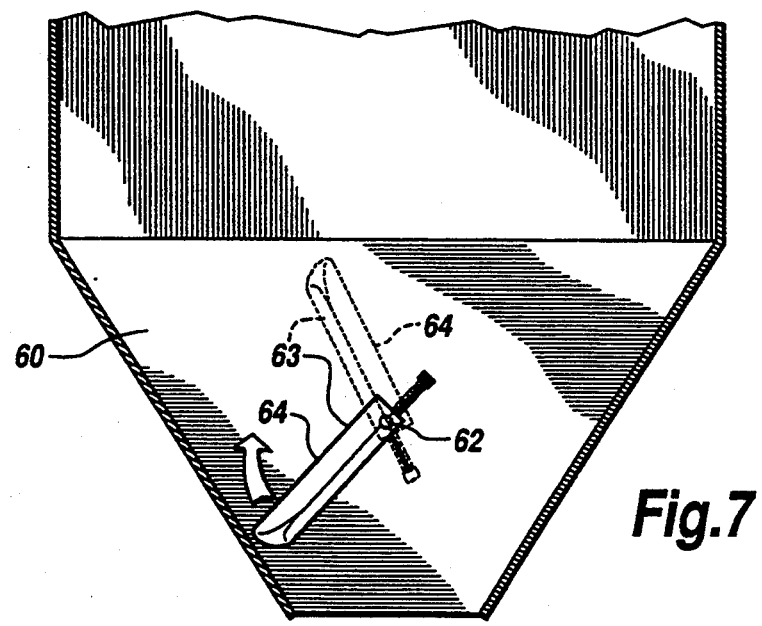
FIG. 7 is a sectional view, as seen along lines 7—7 in FIG. 5.

As shown in FIGS. 5-7, the hopper 37 has a lower section 59 that tapers downward to funnel the uncooked food toward the conveyor belt 47. The lower section 59 of the hopper 37 has a planar wall 60, which angles toward the conveyor belt 47. A small motor 61 is mounted on the wall 60, and a rotating shaft 62 extends from the motor 61 through the wall 60 into the hopper 37.

A wedge-shaped stirring rod 63 is mounted on the shaft 62 within the lower section 59 of the hopper 37. The stirring rod 63 rotates with the shaft 62, in a plane parallel to the wall 60 of the hopper 37. The sharp edge 64 of the stirring rod 63 is the leading edge as the rod rotates through the hopper 37. The stirring rod 63 passes through the uncooked food in the hopper 37 and prevents the food from bridging up. The motor 61 rotates the stirring rod 63 only when the conveyor belt 47 is moving.

When the vending machine has sufficient product and has been activated, an air cylinder 65 opens a door 66 on the weigh basket 51, dropping the selected amount of uncooked food onto a chute 67. The food slides down the chute 67 and through a hole in the partition 25. The hole in the partition 25 is covered by a door 68 on the cooking chamber 29 side of the partition 15, as shown in FIGS. 1 and 7.

When the vending machine 10 is activated, an air cylinder 69 opens the door 68 over the hole in the partition 25. The uncooked food falls through the hole into a fry basket 70, shown in FIGS. 7 and 8. The fry basket 70 has a bottom and four sides and is open on top. The fry basket 70 is connected to a stainless steel deep frier 71, so that the fry basket 70 can be pivoted about a horizontal axis 73.

After the food has fallen into the fry basket 70, an air cylinder 75 retracts to pivot the fry basket 70 and the food down from the load position, shown in FIGS. 7 and 8, into a frying position in the deep frier 71, as shown in phantom in FIG. 8. The deep frier 71 is filled with cooking oil, heated by a heating element 79. The fry basket 70 is made of a perforated screen so that the cooking oil can enter the fry basket 70 to cook the food.

After a programmed amount of cooking time, the air cylinder 75 returns the fry basket 70 to the load position. In this position, the cooking oil drains out of the fry basket 70 and back into the deep frier 71.

Figure 13:
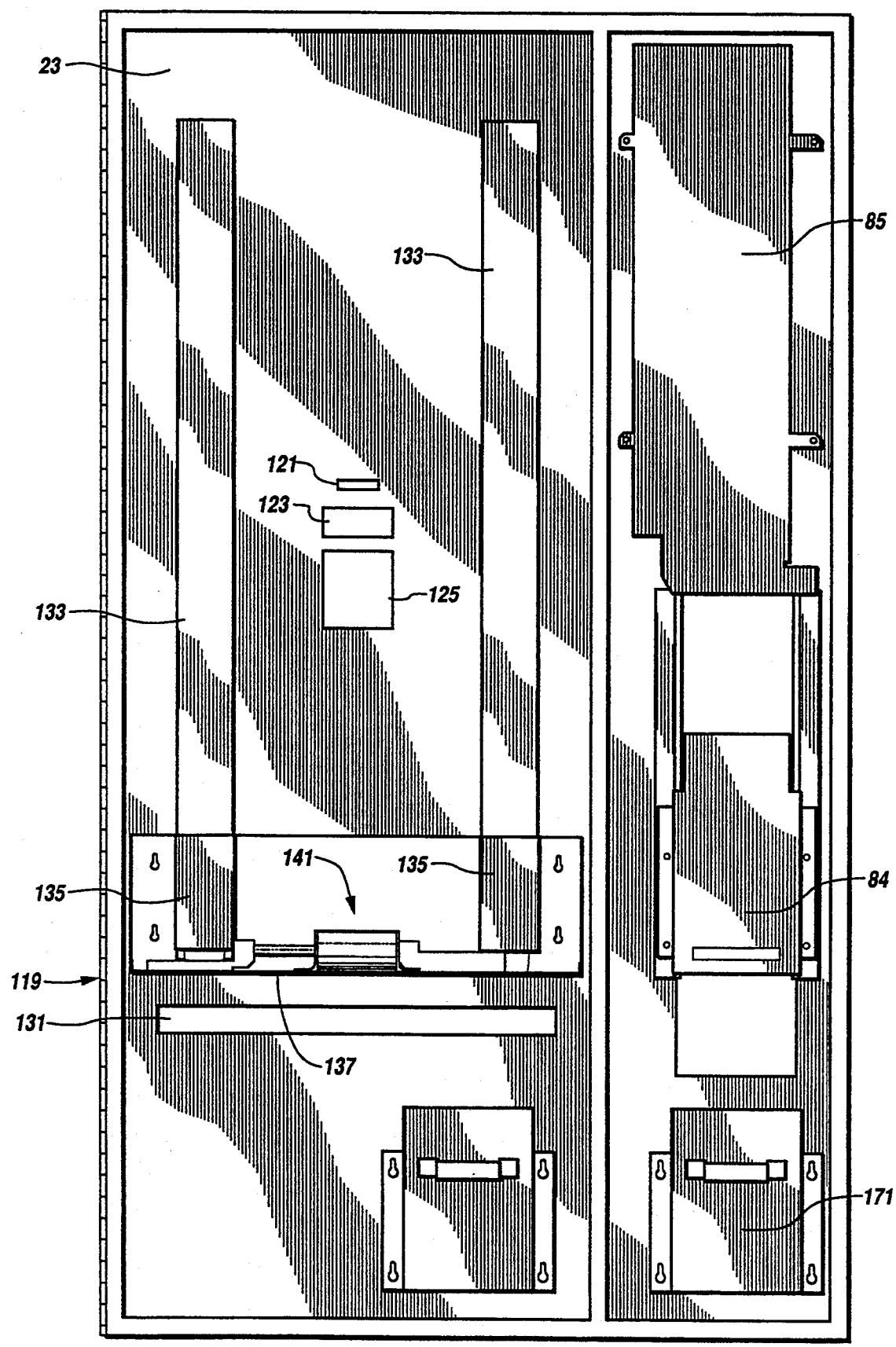
FIG. 13 is a close-up front elevation of the inside of the front door.
Figure 14:
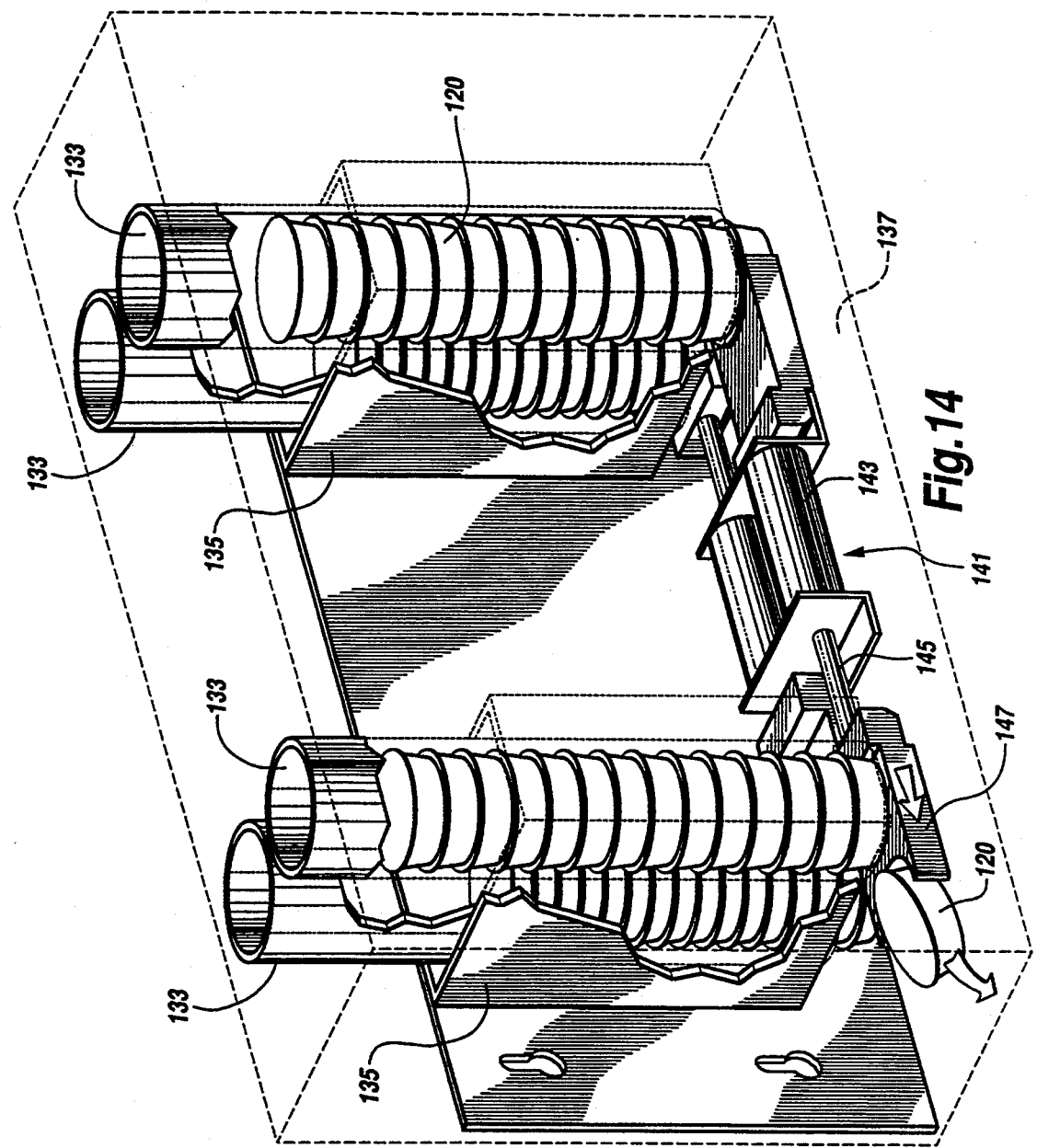
FIG. 14 is a perspective view, partially in section, of the condiment dispenser.
Figure 15:
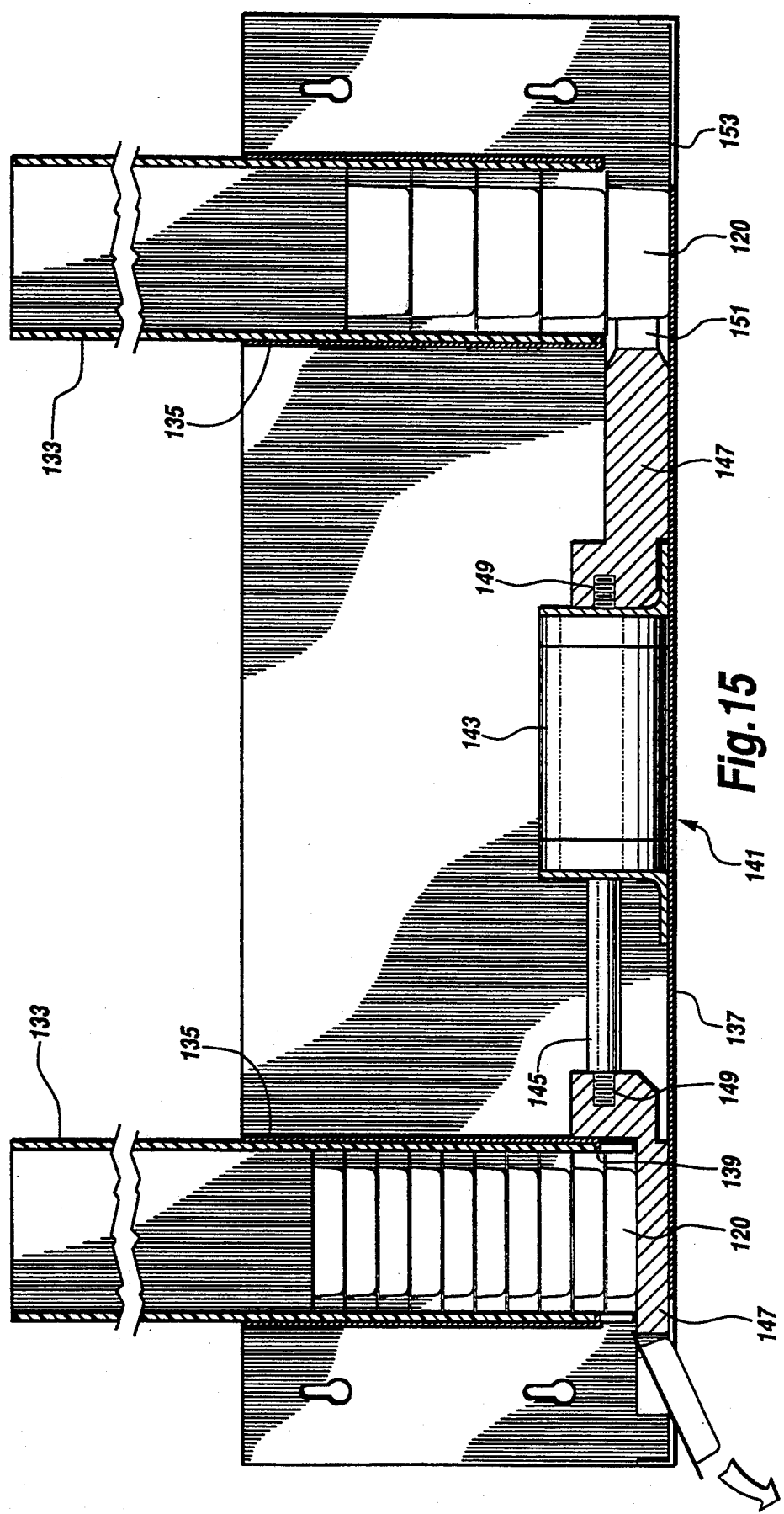
FIG. 15 is cross sectional front view of the condiment dispenser, as seen along line 15—15 in FIG. 16.
Figure 16:
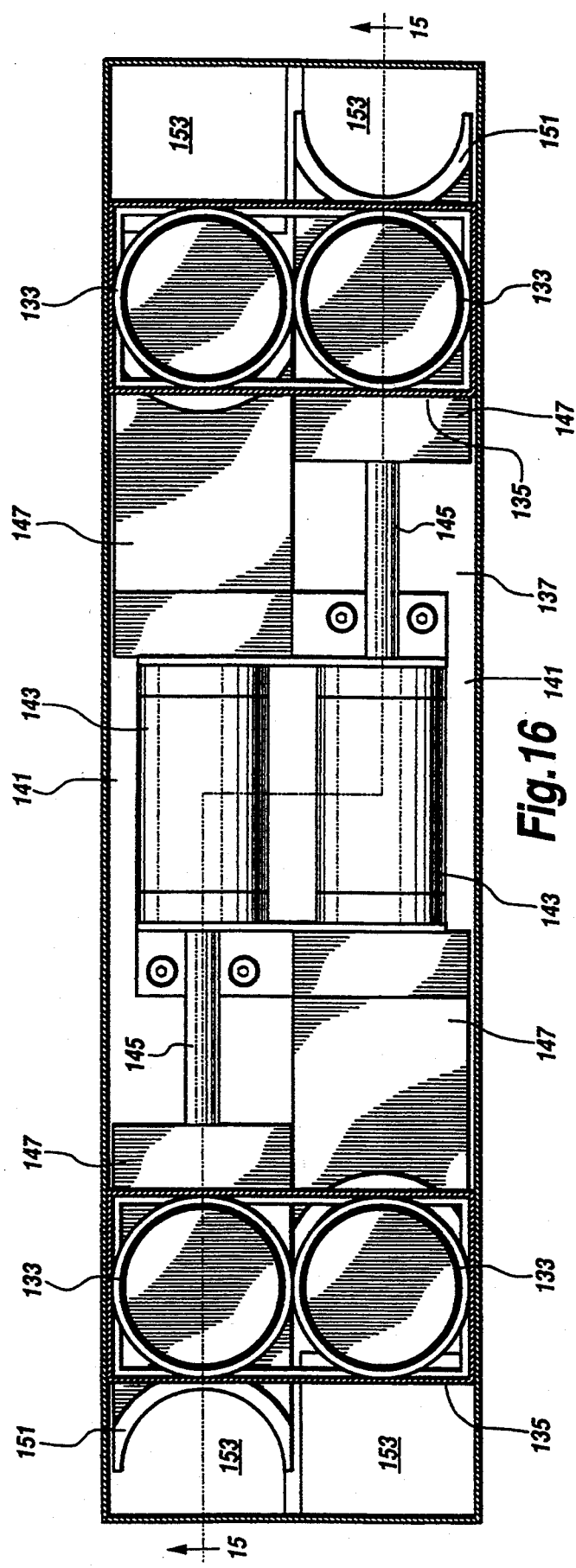
FIG. 16 top plan view of the condiment dispenser.

After a programmed amount of drain time, the fry basket 70 is pivoted further forward to a dump position shown in phantom in FIG. 8. When the fry basket 70 is in this position, the food falls out of the fry basket 70. As the food falls out of the basket 70, the food slides down a small chute 81 into a serving cup located in a product access door 84 located in the front door 23, as shown in FIGS. 1, 3, and 13. The fry basket 70 is then returned to the load position.

A quantity of serving cups are stored in a cup dispenser 85 mounted on the inside of the front door 23, as shown in FIGS. 1 and 13. The dispenser 85 contains two stacks of cups, a primary stack and a back-up stack. When a sensor indicates that the primary stack has run out, an air cylinder unlocks the back-up stack and allows cups from the back-up stack to be used. When the back-up stack is depleted, the vending machine 10 indicates a product out condition to the customer.

After several servings of food have been cooked, the level of the cooking oil in the deep frier 71 may drop below an effective level. At that point, an oil level sensor (not shown) is triggered and an additional amount of cooking oil is added to the deep frier 71. As shown in FIGS. 7 and 8, the additional cooling oil is stored in a stainless steel oil reservoir 93 located above the deep frier 71. An oil valve 95 controls the flow of the oil and an oil tube 97 directs the oil from the reservoir 93 to the deep frier 71.

At periodic times during the day, preferably during periods of low use, the cooking oil in the deep frier can be completely changed. First, the vending operations are disabled and the power to the heating element 79 is cut off. Then, a drain valve 99 opens and the cooking oil drains out of the deep frier 71 into a filtering box 101. The drain valve 99 remains open as the oil valve 95 opens and allows cooking oil to flow through the deep frier 71 to rinse sediment out of the deep frier 71. The drain valve 95 then closes and the deep frier 71 is refilled with fresh cooking oil. The heating element 79 is turned back on for a time period before the vending operation is allowed, to insure that the cooking oil is sufficiently heated.

The cooking oil in the filtering box 101 flows through a pair of oil polishing filters (not shown) to filter the oil. A recycling pump 103 then pumps the filtered oil up to the oil reservoir 93 for reuse.

Cooking odors are contained within the vending machine cabinet 11 and eliminated by an air purification system, shown in FIGS. 1, 2, and 7. Air within the cooking chamber 29 is moved by a chilled, forced air blower 105. As hot air rises from the deep frier 71, the air is forced through a stainless steel demister 107. Condensation from the demister 105 is drained into a waste container 109.

The remaining air from the demister 107 is then forced through a series of mesh and woven fiber filters and a carbon filter 111. Any remaining odors are absorbed by the carbon. The purified air is then passed across a chilled condenser coil 113 to cool the cooking chamber 29.

As seen in FIG. 1, the area below the freezer compartment 31 houses several components. The vending machine 10 is controlled by a commercially available programmable control unit 115 containing logic and memory. A separate microprocessor 116 monitors the temperatures of the cooking oil and the freezer compartment 31 and inhibits the vending operations in the event of a malfunction. As a safety feature, the vending machine 10 includes a fire extinguishing system 117. If the fire extinguishing system 117 is actuated, vending operations are inhibited until the system 117 is replaced.

FIGS. 10-14 illustrate an additional element of the vending machine 10: the condiment dispenser 119. The condiment dispenser 119 is mounted on the inside of the front door 23, and dispenses two different types of condiments in small single serving packages 120.

The front door 23 has a coin slot 121 for the insertion of coins into the vending machine 10, as shown in FIG. 3. Coins inserted into the slot 121 fall through a coin operated mechanism 123 and into a coin box 125.

Selector knobs on the front door 23 allow a customer to select between two different condiments. One or more openings 131 in the door 23 provide an area for the condiment packages 120 to be delivered to a customer.

The internal workings of the condiment dispenser 119 are illustrated in FIGS. 10-13. Stacks of condiment packages 120 are held within four tubes 133. The tubes 133 may be various sizes, to hold condiment packages 120 of different sizes, but generally each tube 133 will hold about fifty packages 120.

Each tube 133 is placed within one of four receivers 135. The inside diameters of the receivers 135 are slightly larger than the outside diameters of the tubes 133. Thus, the tubes 133 can be easily inserted and withdrawn from the receivers 135 for refill.

When a tube 133 is placed within a receiver 135, the first condiment package 120 rests upon a horizontal support platform 137. The support platform 137 is located above the opening 131 in the door 23 of the vending machine 10.

Condiment packages 120 are generally manufactured in two standard sizes, one size being about twice as tall as the other. Both sizes of packages 120 have about the same diameter.

Each receiver 135 has one or more inward projections 139. When the bottom of a tube 133 rests upon a projection 139, the tube 133 is positioned at a higher position. This higher position is used for condiment packages 120 of the larger size. In this position, the bottom of the tube 133 is above the top of the first of the larger condiment packages 120, and below the top of the second package 120.

Each tube 133 has one or more slots, for cooperation with the projections 139 on the receivers 135. When the smaller packages 120 are used, the tube 133 is turned until the slots align with the projections 139. The tube 133 then will rest in a lower position. The lower position is used for smaller condiment packages 120. In this position, the bottom of the tube 133 is above the top of the first of the smaller condiment packages 120, and below the top of the second package 120.

In the preferred embodiment, the vending machine 10 contains four receivers 135 for holding four tubes 133 of condiment packages 120. The two receivers 135 in the front of the machine 10 hold one type of condiment package 120, and the two receivers 135 in the rear of the machine 10 hold a second type of condiment package 120. In the embodiment shown in the drawings, the front tubes 133 are holding smaller packages 120 and the rear tubes 133 are holding larger packages 120.

A pair of cylinder and piston assemblies 141 are mounted between each pair of receivers 135. Each assembly 141 has a dual action cylinder 143 and two opposing piston rods 145. The cylinders 143 may be hydraulic, but are preferably pneumatic. When one piston rod 145 is extended, the opposing piston rod 145 is retracted.

A push block 147 is attached to the end of each piston rod 145 with a pin 149. The push blocks 147 are made in two sizes, depending on the size of condiment package 120 being sold. In the embodiment shown, smaller push blocks 147 are used on the front piston rods 145 and larger push blocks 147 are used on the rear piston rods 145. Each push block 147 has a concave forward edge 151 for contacting the condiment packages 120. The push blocks 147 can be easily changed if the size of the condiment packages 120 is changed.

When one of the piston rods 145 is extended, the push block 147 on the end of that rod 145 slides along the support platform 137 and passes under the bottom of the corresponding tube 133. The push block 147 pushes the first condiment package 120 out from under the second package 120, as the second package 120 is held in place by the tube 133. When the piston rod 145 is fully extended, the push block 147 pushes the first package 120 into an opening 153 in the support platform 137. The first package 120 falls through the opening 153 and down to the opening 131 in the door 23.

As one piston rod 145 is extended, the opposing piston rod 145 on the same cylinder and piston assembly 141 is retracted. When the piston rod 145 is retracted, the push block 147 on that rod 145 is pulled out from under the tube 133. As the push block 147 clears the tube 133, the second condiment package 120 falls to the support platform 137.

Figure 17:
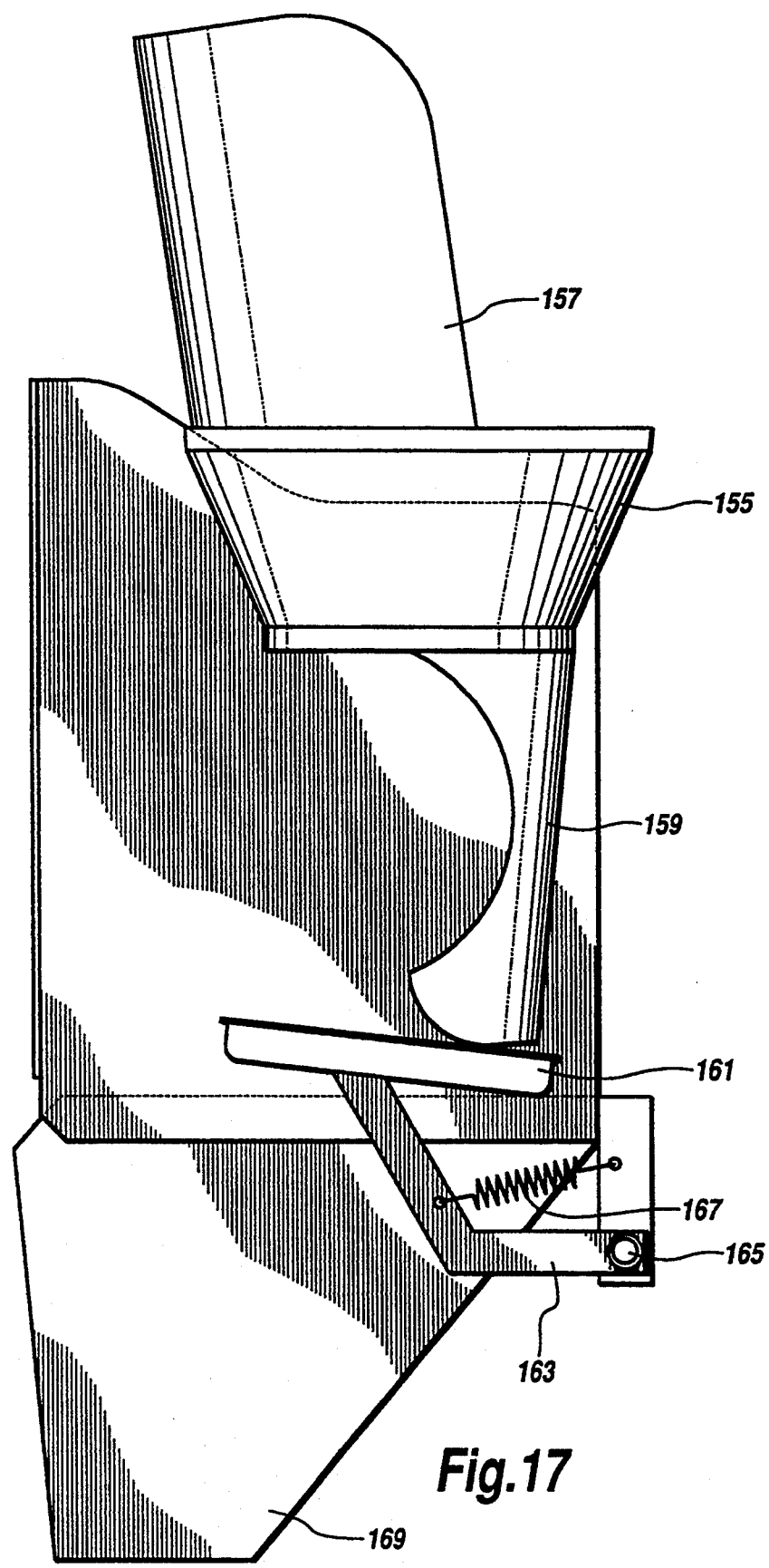
FIG. 17 is a left side elevation of the product access mechanism.

FIG. 17 illustrates the product access mechanism. This mechanism is located behind the product access door 84, but is not shown in FIGS. 1 and 13 for clarity. The mechanism includes a funnel 155 and a funnel extension 157, mounted on the front door 23 directly below the cup dispenser 85, shown in FIGS. 1 and 13. Below the funnel 155 is a cup holder 159, which positions the cup on a platform 161.

The platform 161 is supported by a pair of support arms 163, which pivot about a pivot pin 165. A helical spring 167 biases the support arms 163 in the upper position, shown in FIG. 17. However, the spring 167 allows the cup and the platform 161 to be moved downward, pivoting about the pivot point 165. This allows the cup to be shaken to settle the cooked food in the cup, and to remove the cup from the platform 161 without hitting the food against the funnel 155.

A discard funnel 169 is located below the platform 161 to catch food that is spilled from the cup. The discarded food is directed into a container 171, shown in FIGS. 1 and 13. The container 171 can be easily removed from the front door 23 and emptied.

In operation, the vending machine 10 begins with the food hopper 37 and the weigh basket 51 full of uncooked food, and the deep frier 71 and the oil reservoir 93 full of cooking oil. The cup dispenser 85 is full of cups, and the condiment dispenser 119 is full of condiment packages 120.

The vending machine 10 is actuated by a customer placing the correct amount of money in the coin slot 121 and making a selection. The coin operated mechanism 123 causes the weigh basket door 66 to open, dropping the uncooked food onto the chute 67. The door 68 in the partition 25 opens, allowing the food to pass through the hole in the partition 25 and into the fry basket 70.

The fry basket 70 then pivots downward into the hot cooking oil in the deep frier 71. After a set time period, the fry basket 70 pivots back up to the load/drain position. The cooking oil drains off of the food and out of the fry basket 70. The fry basket 70 then pivots further to cause the food to fall out of the fry basket 70 down the small chute 81.

When the vending machine 10 is actuated, a serving cup is dropped from the cup dispenser 85 onto the funnel 91. The cooked food falls from the small chute 81 into the serving cup in the funnel 91. The customer can then remove the serving cup from the serving door 149 on the front of the vending machine 10, as seen in FIG. 3.

The customer selects which of the two types of condiments is desired, and the condiment dispenser 119 dispenses a condiment package 120. The cylinder 143 extends the proper piston rod 145, to push the selected condiment package 120 out from under the tube 133 and into the opening 153 in the support platform 137. The condiment package 120 then falls to the opening 153 in the door 23 of the vending machine 10.

The conveyor belt 47 then advances to refill the weigh basket 51. When the selected amount of food has been placed in the weigh basket 51, the limit switch 75 cuts off the conveyor belt 47. If the deep frier 71 is low on cooking oil, the level is restored by oil from the reservoir 93. If the primary stack of cups is empty, the back-up stack is released for use.

Periodically, the cooking oil in the deep frier 71 is replaced. The old oil is drained into the filtering box 101, and fresh oil from the reservoir 93 is added to the deep frier 71. The old oil is filtered and returned to the reservoir 93.

The vending machine of the invention has several advantages over the early deep frier vending machines. The machine 10 of the invention provides an inexpensive, effective method of automatically cooking and selling fried foods. The cooking oil can be filtered and reused in the deep frier 71, so less oil and fewer service calls are required. Also, the food hopper 37 can be easily cleaned and refilled, because of the ability of the hopper 37 to slide forward and to tilt. All of the components located within the cooking chamber are made of stainless steel, so that the components are more durable easily cleaned. Also, the modular components of the invention are easy to replace when necessary.

Further, the condiment packages 120 can be loaded in to the tubes 133 at an office and then delivered to the vending machine 10. This saves the time required to load packages 120 into a prior art vending machine. The tubes 133 hold the packages 120 in neat, efficient vertical stacks, which seldom jam or misfeed.

The invention has been shown in only one embodiment. It should be apparent to those skilled in the art that the invention is not so limited, but is susceptible to various changes and modifications without departing from the spirit of the invention.

I claim:
1. An apparatus for vending fried foods, comprising:
   a cabinet having a cabinet door and an inner panel dividing the inside of the cabinet into a storage chamber and a cooking chamber;
   a freezer compartment, mounted within the storage chamber, for keeping uncooked food at a temperature below a selected level;
   a hopper for holding uncooked food within the freezer compartment;
   a deep frier mounted in the cooking chamber and containing cooking oil for cooking a selected amount of food;
   a fry basket for holding the selected amount of food in the deep frier;
   transfer means for transferring the selected amount of uncooked food from the hopper to the fry basket;
   delivery means for transporting the selected amount of cooked food from the deep frier to a customer;
   a support platform within the cabinet;
   a tube, having a lower end, for holding a vertical stack of condiment packages, wherein the first condiment package rests upon the support platform;
   a receiver for holding the tube above the support platform in a position wherein the lower end of the tube is located above the top of first condiment package and below the top of the second condiment package;
   a push block for pushing the first condiment package out from under the stack of condiment packages; and
   a cylinder and piston rod assembly for pushing the push block under the tube, and for pulling the push block out from below the tube to allow the stack of condiment packages to fall to a position wherein the second package rests upon the support platform.

2. An apparatus for vending fried foods, as recited in claim 1, wherein the receiver further comprises:
   a lower end; and
   a inward projection for cooperation with a slot on the lower end of the tube to allow the tube to be positioned at either a higher position, in which the lower end of the tube rests upon the projection, and a lower position, in which the projection extends into the slot in the tube.

3. An apparatus for vending fried foods, as recited in claim 1, wherein the push block has a concave surface for contact with the condiment packages.

4. An apparatus for vending fried foods, as recited in claim 1, further comprising a coin operated mechanism for causing the cylinder and piston assembly to operate in response to the insertion of an adequate amount of coins into the mechanism.

5. An apparatus for vending fried foods, as recited in claim 1, wherein the support platform has an opening and the push block pushes the first condiment package into the opening.

6. An apparatus for vending fried foods, as recited in claim 1, wherein the push block is replaceable with a push block of a different size.

7. An apparatus for vending fried foods, comprising:
- a cabinet having a cabinet door and an inner panel dividing the inside of the cabinet into a storage chamber and a cooking chamber;
- a freezer compartment, mounted within the storage chamber, for keeping uncooked food at a temperature below a selected level;
- a hopper for holding uncooked food within the freezer compartment;
- a stirring rod mounted within the hopper for stirring the uncooked food within the hopper;
- a deep frier mounted in the cooking chamber and containing cooking oil for cooking a selected amount of food;
- a fry basket for holding the selected amount of food in the deep frier;
- transfer means for transferring the selected amount of uncooked food from the hopper to the fry basket; and
- delivery means for transporting the selected amount of cooked food from the deep frier to a customer.

8. An apparatus for vending fried foods, as recited in claim 7, wherein the stirring rod is mounted on a rotating shaft.

9. An apparatus for vending fried foods, as recited in claim 8, wherein the stirring rod rotates only when the transfer means is operating.

10. An apparatus for vending fried foods, as recited in claim 7, wherein the stirring rod has a wedge shaped cross section.

11. An apparatus for vending fried foods, as recited in claim 7, wherein the hopper has a lower section that tapers downward, and the stirring rod is located within the lower section of the hopper.

12. An apparatus for vending fried foods, as recited in claim 11, wherein the lower section of the hopper has a planar wall, and the stirring rod rotates in a plane that is parallel to the wall of the hopper.

13. An apparatus for vending fried foods, as recited in claim 12, wherein the stirring rod has a wedge shaped cross section, and the stirring rod rotates with the sharp edge of the wedge as the leading edge.

14. An apparatus for vending fried foods, comprising:
- a cabinet having a cabinet door and an inner panel dividing the inside of the cabinet into a storage chamber and a cooking chamber;
- a freezer compartment, mounted within the storage chamber, for keeping uncooked food at a temperature below a selected level;
- a hopper for holding uncooked food within the freezer compartment;
- a weigh basket for holding a selected amount of uncooked food within the freezer compartment;
- conveying means for conveying uncooked food from the hopper to the weigh basket;
- a deep frier mounted in the cooking chamber and containing cooking oil for cooking the selected amount of food;
- a fry basket for holding the selected amount of food in the deep frier;
- transfer means for transferring the selected amount of uncooked food from the weigh basket to the fry basket; and
- delivery means for transporting the selected amount of cooked food from the deep frier to a customer.

15. An apparatus for vending fried foods, as recited in claim 14, wherein the conveying means includes a continuous belt of cleats which pass through the hopper.

16. An apparatus for vending fried foods, as recited in claim 14, further comprising sensing means for shutting off the conveying means when the selected amount of uncooked food has been conveyed into the weigh basket.

17. An apparatus for vending fried foods, as recited in claim 14, wherein the delivery means includes a support platform for holding a cup.

* * * * *